United States Patent
Schalla

(10) Patent No.: US 10,252,804 B2
(45) Date of Patent: Apr. 9, 2019

(54) GALLEY REFRIGERATION SYSTEM OF AN AIRCRAFT

(71) Applicant: THE BOEING COMPANY, Chicago, IL (US)

(72) Inventor: James P. Schalla, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 113 days.

(21) Appl. No.: 14/716,409

(22) Filed: May 19, 2015

(65) Prior Publication Data

US 2016/0340044 A1 Nov. 24, 2016

(51) Int. Cl.
| | |
|---|---|
| *B64D 11/04* | (2006.01) |
| *B64D 11/00* | (2006.01) |
| *F25D 16/00* | (2006.01) |
| *F28D 15/00* | (2006.01) |
| *F28F 27/00* | (2006.01) |
| *B64D 13/06* | (2006.01) |

(52) U.S. Cl.
CPC .......... *B64D 11/04* (2013.01); *B64D 11/0007* (2013.01); *F25D 16/00* (2013.01); *F28D 15/00* (2013.01); *F28F 27/00* (2013.01); *B64D 2013/0629* (2013.01); *Y02T 50/46* (2013.01)

(58) Field of Classification Search
CPC .............. B64D 11/04; B64D 11/0007; B64D 2013/0629; F25D 16/00; F28D 15/00; F28D 27/00
See application file for complete search history.

(56) References Cited

U.S. PATENT DOCUMENTS

| | | | | |
|---|---|---|---|---|
| 4,361,014 A * | 11/1982 | Blain | ................... | A47J 39/006 62/237 |
| 5,513,500 A * | 5/1996 | Fischer | .............. | B64D 11/0007 62/239 |
| 6,832,504 B1 * | 12/2004 | Birkmann | ............. | G01M 3/002 340/605 |
| 6,845,627 B1 * | 1/2005 | Buck | ...................... | B64D 11/04 165/919 |
| 6,880,351 B2 * | 4/2005 | Simadiris | ............... | B64D 11/04 62/185 |
| 8,474,274 B2 | 7/2013 | Schalla et al. | | |
| 9,238,398 B2 * | 1/2016 | Lu | ....................... | B60H 1/00592 |
| 9,802,703 B2 * | 10/2017 | Moran | ................... | B64D 11/04 |

(Continued)

FOREIGN PATENT DOCUMENTS

EP 2845802 A1 3/2015

OTHER PUBLICATIONS

Extended European Search Report for corresponding EP Application No. 16 16 6591 dated Oct. 21, 2016; 8 pages.

*Primary Examiner* — Philip J Bonzell
(74) *Attorney, Agent, or Firm* — Jay J. Hoette; The Small Patent Law Group, LLC

(57) ABSTRACT

A galley refrigeration system includes a liquid heat exchange loop and an air heat exchange loop in thermal communication with the liquid heat exchange loop. The air heat exchange loop includes a heat exchanger configured to be coupled in flow communication with at least one galley cart. Optionally, the galley refrigeration system may include a control system in operative communication with the liquid heat exchange loop and the air heat exchange loop.

27 Claims, 3 Drawing Sheets

(56) References Cited

U.S. PATENT DOCUMENTS

| | | | |
|---|---|---|---|
| 2007/0084226 A1* | 4/2007 | Simadiris | B64D 11/04 62/184 |
| 2013/0047657 A1* | 2/2013 | Oswald | B64D 11/04 62/407 |
| 2014/0008037 A1* | 1/2014 | Trumper | B64D 13/00 165/96 |
| 2015/0007600 A1* | 1/2015 | Godecker | B64D 11/04 62/238.6 |
| 2015/0313356 A1* | 11/2015 | Burgess | A47B 31/02 62/79 |
| 2016/0114892 A1* | 4/2016 | Moran | B64D 11/04 244/118.5 |

* cited by examiner

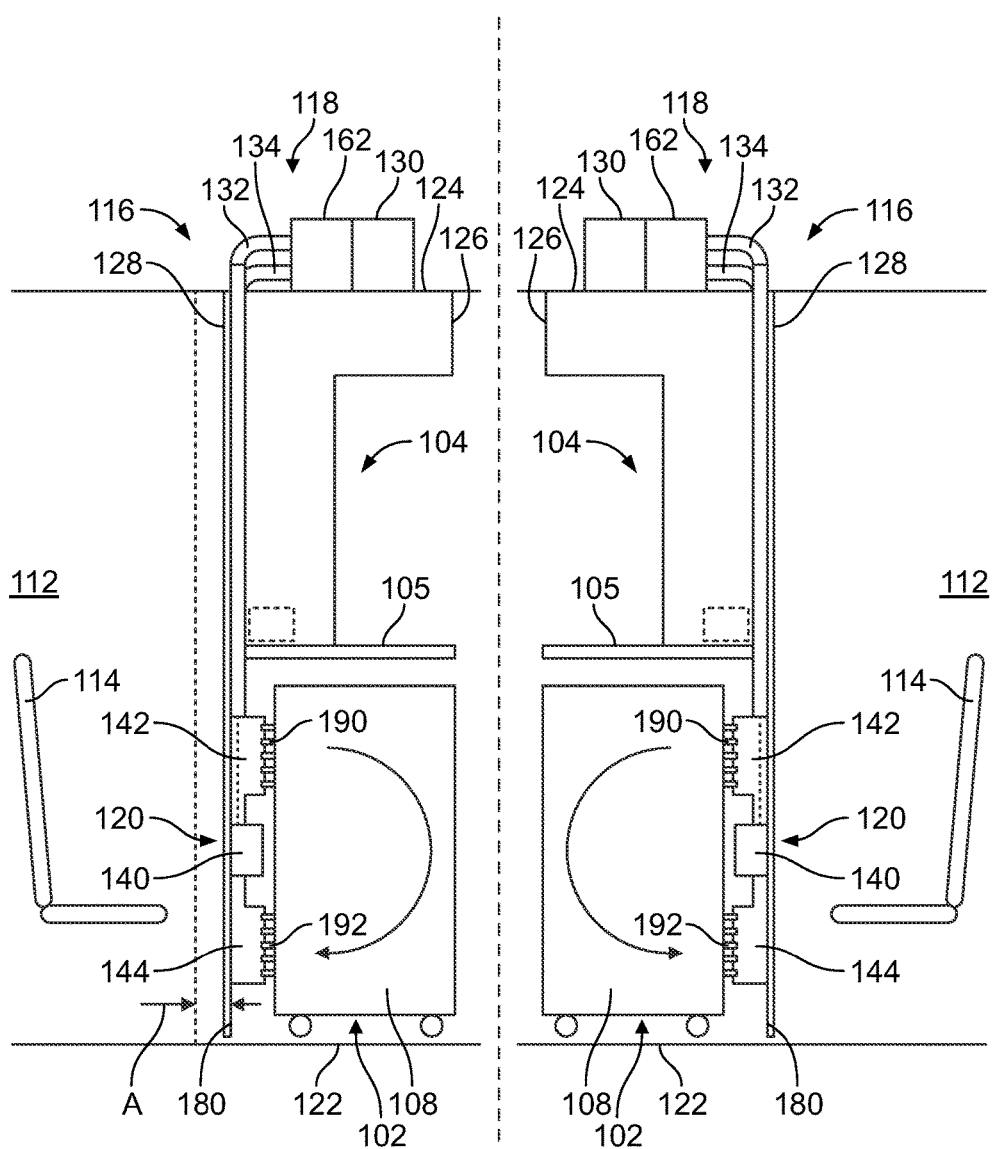

GALLEY REFRIGERATION SYSTEM OF AN AIRCRAFT

BACKGROUND

The present disclosure relates generally to systems and methods of refrigeration a galley of an aircraft.

Aircraft typically include multiple galleys to store food and beverages on the aircraft. The food and beverages are typically stored in galley carts which are transported to the aircraft and stored in refrigerated compartments or zones in the galleys. A refrigeration system is provided with heat exchanger at the top of the galley and air ducts and other components that supply cooled air from the heat exchanger to each of the galley carts in the compartments or zones. The air ducts are routed along the rear wall of the galley to the cart compartment to supply the cooled air to the cart compartment and the galley carts therein and to return the air to the heat exchanger. Typically, the single heat exchanger is used to supply cool air to all of the galley carts and thus cools all of the galley carts to the same temperature. Additionally, because the refrigeration system uses a single heat exchanger, the heat exchanger has a high capacity and uses a large blower or fan to move the air through the system. The large fan is loud and inefficient using a large amount of power.

Additionally, a large amount of space is required for the airflow supply and return components, such as the ducts and the valves that interface with the galley carts. The footprint of the galley is deep enough to accommodate the galley carts as well as the airflow supply and return components. The galleys occupy valuable space within the cabin of the aircraft, which limits the number of passenger seats that may be provided on the aircraft. For example, the airflow supply and return components may add approximately 4-5 inches (in) (10-13 centimeters (cm)) of depth to the galleys, and some aircraft may have eight or more galleys, leading to a large amount of cabin space dedicated to the airflow supply and return components, which may be used for other purposes.

SUMMARY

In accordance with one embodiment, a galley refrigeration system is provided including a liquid heat exchange loop and an air heat exchange loop in thermal communication with the liquid heat exchange loop. The air heat exchange loop includes a heat exchanger configured to be coupled in flow communication with at least one galley cart. Optionally, the galley refrigeration system may include a control system in operative communication with the liquid heat exchange loop and the air heat exchange loop.

In accordance with a further embodiment, a galley system is provided including a galley having a rear wall. The galley system includes a liquid heat exchange loop in the galley and an air heat exchange loop in the galley. The air heat exchange loop extends in the galley and is in thermal communication with the liquid heat exchange loop. The air heat exchange loop includes a heat exchanger configured to be coupled in flow communication with a refrigerated compartment.

The features and functions that have been discussed can be achieved independently in various embodiments or may be combined in yet other embodiments, further details of which can be seen with reference to the following description and drawings.

BRIEF DESCRIPTION OF THE DRAWINGS

FIG. 2 is a side cross-sectional view of a galley and galley refrigeration system of the galley system in accordance with an exemplary embodiment.

FIG. 3 is an opposite side cross-sectional view of the galley and galley refrigeration system.

DETAILED DESCRIPTION

Figure 1:
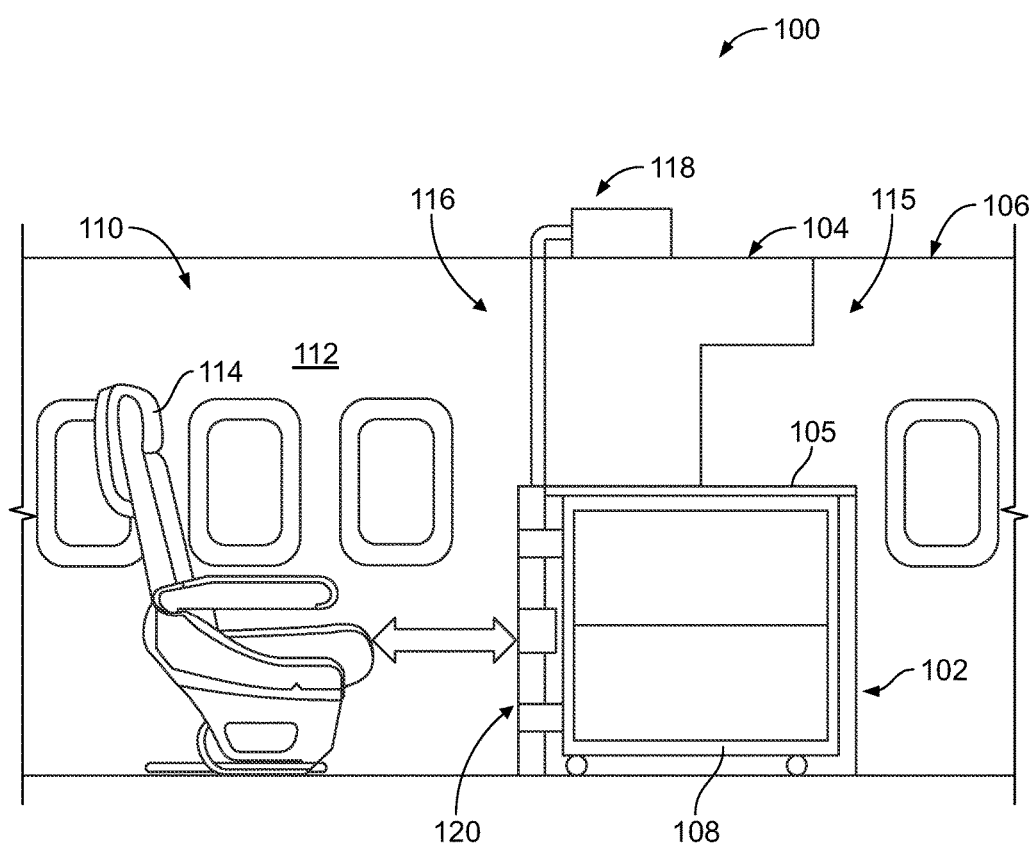
FIG. 1 is a schematic illustration of an exemplary galley system for an aircraft.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a galley refrigeration system for an aircraft configured to supply refrigerated air to a cart compartment of a galley monument, or simply galley, for refrigerating galley carts. Various embodiments provide a liquid heat exchange loop and an air heat exchange loop in thermal communication with the liquid heat exchange loop. The galley refrigeration system includes components arranged to reduce a size or footprint of the galley monument, which may provide additional space in the passenger compartment, such as for adding additional room for passenger seating. Various embodiments provide an efficient refrigerated environment for the galley carts using air-through-cart refrigeration arrangements. Various embodiments provide individual galley cart temperature control.

FIG. 1 is a schematic illustration of an exemplary galley system 100 for an aircraft 106. The galley system 100 is used to cool galley carts 108 held in cart compartments 102 of a galley 104. The galley 104 defines one or more cart compartments 102, which are typically arranged below a counter 105 of the galley 104. The galley 104 is positioned within a cabin 110 of the aircraft 106, and the cabin of the aircraft 106 is divided into a passenger area 112, where passenger seats 114 are located, and a galley area 115, where the galley 104 is located. The passenger area 112 is the area exterior of the galley 104 within the aircraft 106 where passengers are able to be located. The galley area 115 has a working area for the galley crew forward of the galley 104 where the cart compartments 102, counter 105 and cabinets or storage bins may be accessed. Space dedicated to the galley 104 is unusable for passenger seats 114 or other purposes such as lavatories, and thus it may be desirable for aircraft manufacturers to reduce the footprint of the galley area 115 in order to increase the passenger area 112 to increase revenue of each flight for aircraft operators.

As used herein a cart compartment is an insulated or uninsulated volume that is utilized to store one or more galley carts on the aircraft 106. The cart compartment may define one or more refrigerated compartments that receives refrigerated cooling. A galley cart, as used herein, is a portable device that is used to store food and/or beverages that are transported from a caterer to the aircraft 106 or from the cart compartments 102 to other parts of the aircraft 106 for serving the food and/or beverages. The galley carts may include wheels, however some galley carts may be hand carried boxes in some embodiments. The galley carts may define refrigerated compartments.

The galley 104 may include any number of cart compartments 102 and the aircraft 106 may include any number of galleys 104. The galleys 104 are typically arranged near the doors of the aircraft 106, such as at the fore and/or aft of the cabin 110, but may be located mid-cabin in some embodiments. Each cart compartment 102 may hold any number of galley carts 108. For example, each cart compartment 102 may have multiple cart bays, which may be separated from other cart bays by divider walls within the cart compartment 102. The galleys 104 may be used for the storage and/or preparation of food or beverages. Some galleys may be bar units used strictly for preparation of beverages. Some galleys may be incorporated into other monuments used for other purposes such as closets, workstations, lavatories, and the like.

The galley system 100 includes a galley refrigeration system 116 that provides cooled air for the galley 104. Components of the galley refrigeration system 116 may be positioned above the galley 104 (e.g., in the crown of the aircraft 106), may be positioned in the galley 104, and/or may be positioned below the galley 104 (e.g., in the belly of the aircraft 106). In an exemplary embodiment, the galley refrigeration system 116 includes a liquid heat exchange loop 118 and at least one air heat exchange loops 120 in flow communication with the liquid heat exchange loop 118. The liquid heat exchange loop 118 is used to supply cold liquid to the air heat exchange loop(s) 120 for heat transfer. Optionally, the liquid heat exchange loop 118 may be a vapor cycle chiller. The air heat exchange loop(s) 120 are used to supply cold air to the cart compartment 102 (e.g., to form a refrigerated compartment) and the galley carts 108 in the cart compartment 102.

FIG. 2 is a side cross-sectional view of the galley 104 and galley refrigeration system 116 in accordance with an exemplary embodiment. FIG. 3 is an opposite side cross-sectional view of the galley 104 and galley refrigeration system 116. The galley 104 includes a bottom 122, which may be the airplane floor or the galley area floor, a top 124, a front 126 and a rear 128 opposite the front 126, and may include at least one side (not shown). The rear 128 may be fore or aft facing, depending on the orientation of the galley 104 within the cabin 110. The rear 128 may face the passenger area 112 (e.g., passenger seats 114 may be located behind the rear 128, in front of the rear 128, and the like); however in alternative embodiments, the rear 128 may be positioned against a bulkhead.

In an exemplary embodiment, the galley refrigeration system 116 is positioned at the top 124 and along the rear 128; however the components of the galley refrigeration system 116 may be positioned at other locations in alternative embodiments. The components of the galley refrigeration system 116 may extend into the cart compartment 102 to interface with the galley carts 108 to supply cool air to the galley carts 108 in an air-through-cart supply arrangement. Alternatively, the galley refrigeration system 116 may supply air by an air-over-cart arrangement. In the illustrated embodiment, the liquid heat exchange loop 118 includes components along the top 124 and along the rear 128 that extend to the cart compartment 102, while the air heat exchange loop(s) 120 include components along the rear 128, such as in the cart compartment 102, that interface with and provide cold air to the galley carts 108.

Figure 4:
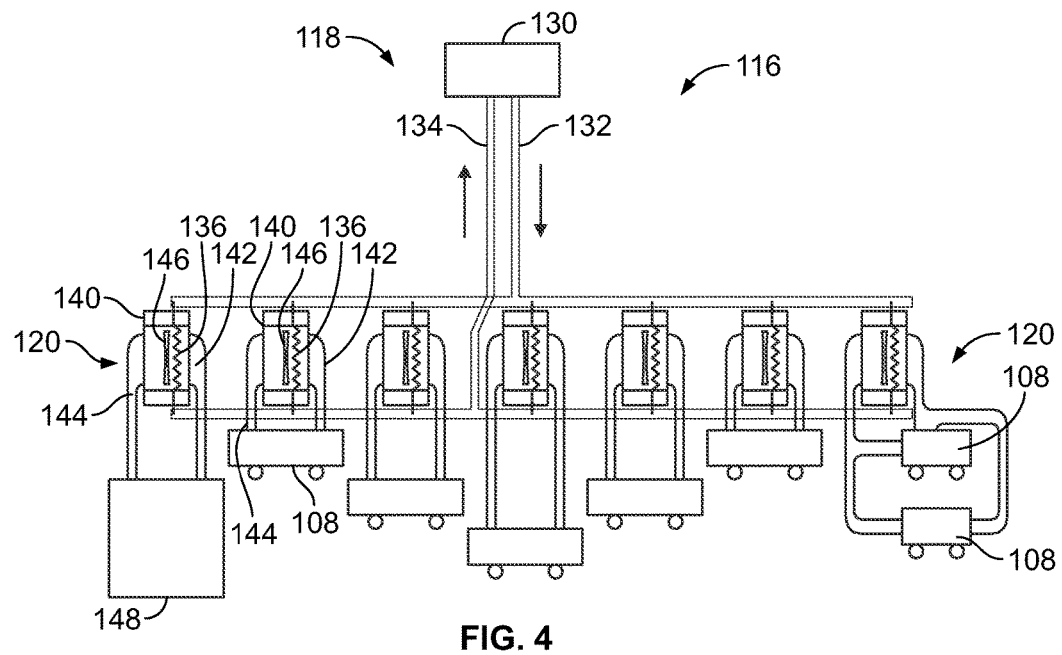
FIG. 4 is a schematic illustration of the galley system showing various components of the galley refrigeration system.

FIG. 4 is a schematic illustration of the galley system 100 showing various components of the galley refrigeration system 116. The galley refrigeration system 116 includes the liquid heat exchange loop 118 and a plurality of air heat exchange loops 120 in thermal communication with the liquid heat exchange loop 118.

The liquid heat exchange loop 118 includes a chiller 130, a supply line 132 in flow communication with the chiller 130 and a return line 134 in flow communication with the chiller 130. Cold liquid is forced through the liquid heat exchange loop 118 for refrigerating the air heat exchange loops 120. In an exemplary embodiment, the liquid heat exchange loop 118 includes a plurality of heat exchange coils 136 associated with corresponding air heat exchange loops 120. The heat exchange coils 136 connect between the supply line 132 and the return line 134. In an exemplary embodiment, the heat exchange coils 136 are arranged in parallel between the supply line 132 and the return line 134. The heat exchange coils 136 may be connected to a manifold at the supply line 132 and/or the return line 134. Cold liquid is supplied from the chiller 130 through the supply line 132 to each of the heat exchange coils 136. The liquid is then transferred from the heat exchange coils 136 to the chiller 130 in the return line 134.

While a plurality of air heat exchange loops 120 are illustrated in FIG. 4, any number of air heat exchange loops 120, including a single air heat exchange loop 120, may be provided in the galley refrigeration system 116. In an exemplary embodiment, a separate air heat exchange loop 120 is provided for each galley cart 108. Alternatively, one or more of the air heat exchange loops 120 may be in flow communication with and configured to supply refrigerated airflow to multiple galley carts 108. Optionally, at least one air heat exchange loop 120 may supply cool air to a refrigerated compartment 148, such as a cartless refrigerated compartment that does not receive a galley cart.

Each air heat exchange loop 120 includes a heat exchanger 140, a supply duct 142 in flow communication with the heat exchanger 140 and a return duct 144 in flow communication with the heat exchanger 140. The supply and return ducts 142, 144 are configured to be coupled in flow communication with one or more of the refrigerated compartments 148, such as with at least one galley cart 108 in such refrigerated cart compartment or with one of the cartless refrigerated compartments 148. Optionally, the interior of the galley cart 108 may define a refrigerated compartment, wherein the air heat exchange loop 120 supply the air directly into the galley cart 108 as opposed to the space of the cart compartment 102 around the galley cart 108.

The heat exchanger 140 includes a fan 146 for circulating air in the air heat exchange loop 120. The fan 146 forces airflow past the heat exchange coils 136 to cool the air supplied to the galley carts 108. In an exemplary embodiment, the fan 146 is a variable speed fan to control the airflow in the air heat exchange loop 120. In an exemplary embodiment, each fan 146 of the various air heat exchange loops 120 may be independently controlled, such as to control or vary the temperature of the air in the corresponding air heat exchange loop 120. As such, the galley carts 108 may have independent or separate temperature control.

Figure 5:
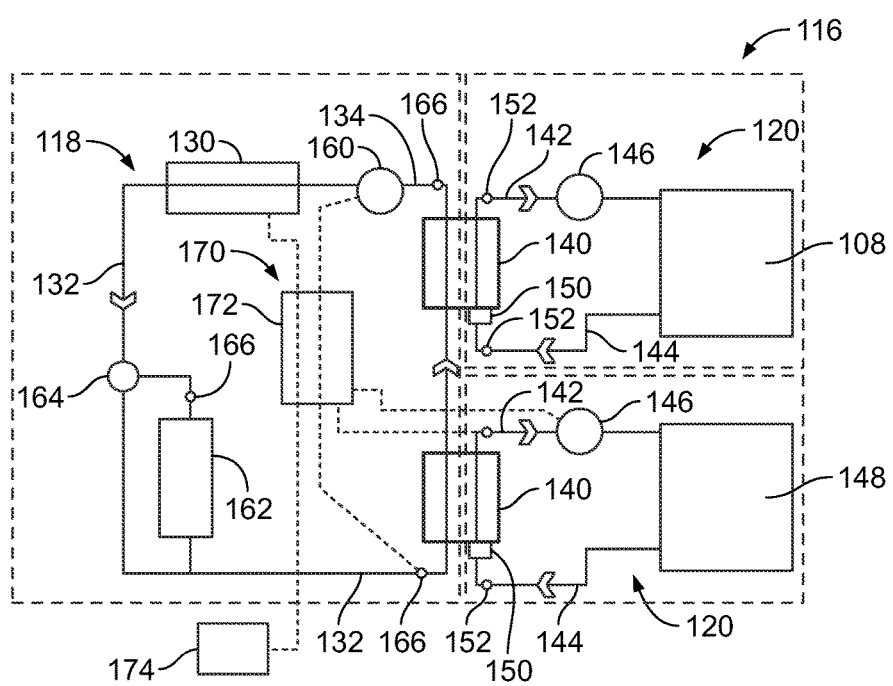
FIG. 5 is a schematic illustration of a portion of the galley system showing the galley refrigeration system in accordance with an exemplary embodiment.

FIG. 5 is a schematic illustration of a portion of the galley system 100 showing the galley refrigeration system 116 in accordance with an exemplary embodiment. The galley refrigeration system 116 includes the liquid heat exchange loop 118 and a plurality of the air heat exchange loops 120. In the illustrated embodiment, one of the air heat exchange loops 120 is used to provide cold air to the refrigerated compartment 148 while another of the air heat exchange loops 120 is configured to supply cold air to a corresponding galley cart 108.

In the illustrated embodiment, the air heat exchange loop 120 is provided with a fan 146 in the supply duct 142; however the fan 146 may be positioned elsewhere, such as in the return duct 144 or in the heat exchanger 140. Other types of air moving devices other than a fan may be used in alternative embodiments to transfer the air in the air heat exchange loop 120. The heat exchanger 140 includes an air filter 150 in the return duct 144. The air filter 150 filters the air prior to the air flowing through the heat exchanger 140.

The air heat exchange loop 120 includes one or more temperature sensors 152 to measure a temperature of the air in the air heat exchange loop 120. For example, one temperature sensor 152 may measure the supply air temperature in the supply duct 142 while another temperature sensor 152 may measure the return air temperature in the return duct 144. The fan speed of the fan 146 may be controlled based on temperature readings from one or more of the temperature sensors 152.

The liquid heat exchange loop 118 includes a pump 160 for circulating the liquid in the liquid heat exchange loop 118. The liquid may be a non-freezing coolant fluid, such as propylene glycol or other type of refrigerant. The pump 160 circulates the fluid through the supply line 132 and the return line 134. The pump 160 circulates the fluid through the chiller 130. Other types of liquid moving devices other than the pump 160 may be used in other embodiments. In some various embodiments, the liquid heat exchange loop 118 may use convection to move the liquid through the loop.

In the illustrated embodiment, the liquid heat exchange loop 118 includes a coolant accumulator 162 in the supply line 132. The accumulator 162 may be insulated. The accumulator 162 allows for coolant thermal expansion and contraction. The accumulator 162 provides a reservoir of cold fluid available for use in the liquid heat exchange loop 118.

Optionally, the liquid heat exchange loop 118 may include an accumulator bypass valve 164 upstream of the coolant accumulator 162. The bypass valve 164 allows the liquid heat exchange loop 118 to bypass the accumulator 162. The coolant may flow from the chiller 130 through the supply line 132 to the heat exchangers 140 without flowing through the accumulator 162. The bypass valve 164 may be used in a defrost mode for sending warm liquid to the heat exchangers 140 to defrost the heat exchangers 140. For example, the chiller 130 may be turned off during the defrost mode and the warm liquid may defrost the heat exchangers 140.

In the illustrated embodiment, the liquid heat exchange loop 118 includes one or more temperature sensors 166 for sensing temperature of the liquid in the liquid heat exchange loop 118. For example, one temperature sensor 166 may measure the supply liquid temperature in the supply line 132 while another temperature sensor 166 may measure the return liquid temperature in the return line 134.

In an exemplary embodiment, the galley refrigeration system 116 includes a control system 170 in operative communication with the liquid heat exchange loop 118 and the air heat exchange loops 120. The control system 170 may be used to control operation of one or more components of the liquid heat exchange loop 118 and/or one or more components of the air heat exchange loops 120. Optionally, more than one control system may be provided, such as a control system for the liquid heat exchange loop 118 and a different control system(s) for the air heat exchange loops 120.

The control system 170 includes a controller 172 operably coupled to the corresponding components. In an exemplary embodiment, the controller 172 is operably coupled to the pump 160, the chiller 130 and the bypass value 164 of the liquid heat exchange loop 118. The pump 160 may be a variable speed pump and the controller 172 may control the speed or output of the pump 160 based on refrigeration demand of the galley refrigeration system 116. The controller 172 may control operation of the chiller 130 to control a temperature of the liquid in the liquid heat exchange loop 118.

In an exemplary embodiment, the controller 172 receives inputs from the temperature sensors 166 to determine the temperature of the liquid in the supply line 132 and the temperature of the liquid in the return line 134. A comparison of the temperature of the liquid upstream of the heat exchangers 140 and downstream of the heat exchangers 140 corresponds to demand or load on the galley refrigeration system 116. The controller 172 may increase refrigeration or decrease refrigeration based on the temperatures measured in the supply line 132 and/or the return line 134.

The controller 172 is operably coupled to the fans 146 of the air heat exchange loops 120. The controller 172 may control the speed of the fans 146 based on refrigeration demand of the galley refrigeration system 116. The controller 172 may independently control operation of the fans 146 of the various air heat exchange loops 120 to achieve different temperatures in different galley carts 108. The control system 170 may control the heat exchanger 140 and/or the fan 146 to achieve a predetermined temperature in the corresponding galley cart 108. The controller 172 may receive inputs from a user input or control panel 174 relating to a desired temperature. For example, the control panel 174 may be associated with the galley 104 and may have user selectable inputs to adjust the temperature of the individual galley carts 108 and/or galley compartments 102. The control panel 174 may have a display. The control panel 174 may be a touchscreen.

In an exemplary embodiment, the controller 172 receives inputs from the temperature sensors 152 to determine the temperature of the air in the supply duct 142 and the temperature of the air in the return duct 144 of the corresponding air heat exchange loop 120. A comparison of the temperature of the air upstream of the galley cart 108 and downstream of the galley cart 108 corresponds to demand or load on the galley refrigeration system 116. The controller 172 may increase refrigeration or decrease refrigeration based on the temperatures measured in the supply duct 142 and/or the return duct 144.

In an exemplary embodiment, the control system 170 is configured to monitor operation of the components of the galley refrigeration system 116 and diagnose problems with components of the galley refrigeration system 116. For example, the control system 170 may diagnose problems with operation of the heat exchangers 140. By measuring the temperature of the supply and return air in the air heat exchange loop 120, the control system 170 may diagnose problems with the heat exchanger 140, which may be a problem with the fan 146. For example, if the temperature in the return air duct 144 is higher than expected or above a threshold, the control system 170 may determine that the heat exchanger 140 and/or the fan 146 are not working properly. The control system 170 may diagnose problems with the fan 146 using other types of sensors, such as a flow meter to measure airflow through the air heat exchange loop 120. The control system 170 may diagnose problems with the galley cart 108. For example, the control system 170 may diagnose problems with the insulation of the galley cart 108 by monitoring the temperature of the air in the air heat exchange loop 120. For example, if the temperature downstream of the galley cart 108, such as in the air return duct 144, is higher than expected or above a threshold, the efficiency of the galley cart 108 may be compromised. The control system 170 may provide feedback to the operator, such as at the control panel 174, indicating a problem with the galley refrigeration system 116 or the galley cart 108. For example, a message, such as "cart in compartment M106 is underperforming—please inspect door seal or insulation for damage", may be provided on the display.

Returning to FIGS. 2 and 3, the galley refrigeration system 116 is arranged within the galley 104. Components of the liquid heat exchange loop 118 may be routed in various portions of the galley 104 to supply and return the liquid as needed. Components of the air heat exchange loop 120 may be routed in various portions of the galley 104 to supply and return the air as needed. In the illustrated embodiment, components of the galley refrigeration system 116 are generally arranged along the rear of the galley 104, such as behind the cabinets, cart compartments 102, galley carts 108 and other compartments of the galley 104.

In an exemplary embodiment, the components of the galley refrigeration system 116 are routed in areas to reduce a depth of at least a portion of the galley 104. For example, the supply and return lines 132, 134 (FIGS. 2 and 3, respectively) of the liquid heat exchange loop 118 may be relatively thin as compared to air ducts of conventional galley systems (e.g., ½ in (1.3 cm) liquid lines versus 3-4 in (7.5-10 cm) wide air ducts) and routed along the rear 128 of the galley 104, which may considerably reduce the depth of the galley 104 along the rear 128 of the galley 104. Such reduction in depth may decrease the footprint or volume of the galley area 115, and thus increase the footprint or volume of the passenger area 112. Optionally, the supply and return ducts 142, 144 (FIGS. 2 and 3, respectively) of the air heat exchange loop 120 may be relatively thin as compared to air ducts of conventional galley systems (e.g., 1-2 in (2.5-5 cm) air ducts versus 3-4 in (7.5-10 cm) wide air ducts) because the volume of airflow in the individual air heat exchange loops 120 is considerably less than the volume of airflow in conventional supply and return systems. The thinner air ducts considerably reduce the depth of the galley 104 along the rear 128 of the galley 104. Such reduction in depth may decrease the footprint or volume of the galley area 115, and thus increase the footprint or volume of the passenger area 112.

In an exemplary embodiment, at least some of the components of the liquid heat exchange loop 118 are provided at the top 124 of the galley 104 (e.g., in the crown of the aircraft 106). For example, the chiller 130 and accumulator 162 may be provided at the top 124. The supply and return lines 132, 134 are routed in a rear wall 180 of the galley 104 at the rear 128. The supply and return lines 132, 134 are routed to the heat exchangers 140. The heat exchangers 140 may be located within the cart compartment 102, such as below the counter 105. Alternatively, the heat exchangers 140 may be located at other locations, such as in a dedicated compartment (shown in phantom) above the counter 105. The heat exchangers 140 may be located within the rear wall 180 in other various embodiments.

In an exemplary embodiment, at least some of the components of the air heat exchange loop 120 are provided near the galley carts 108. For example, the heat exchanger 140 may be provided in or near the cart compartment 102. The supply and return ducts 142, 144 are routed in or along the rear wall 180 to interface with the galley carts 108. The supply and return ducts 142, 144 are in flow communication with the galley cart 108, such as via supply and return valves, vents or other interface devices that interface with corresponding supply and return ports 190, 192 and/or valves, vents or other interface devices of the galley cart 108. Optionally, the supply duct 142 may interface with the galley cart 108 near the top of the galley cart 108 and the return duct 144 may interface with the galley cart 108 near the bottom of the galley cart 108 such that the cool air flows through the galley cart 108 past the trays, food, beverages and the like in the galley cart 108. The supply and return ducts 142, 144 may be located at other locations, such as adjacent to each other at the top or at the bottom.

Other arrangements of the components, supply and return lines 132, 134 and supply and return ducts 142, 144 are possible in alternative embodiments. For example, rather than providing components at the top 124, at least some of the components may be provided below the galley 104, such as below the deck or floor of the cabin and routed to the cart compartment 102 and galley cart 108. Some of the components may be routed under the counter 105 as opposed to along the rear wall 180 to reduce the depth of the cart compartment 102.

In an exemplary embodiment, at least a portion of the rear wall 180 is shifted forward, as compared to conventional galley monuments that provide large airflow supply or return components along the rear wall 180, to reduce the footprint of the galley 104. At least a portion of the rear wall 180 is shifted toward the galley cart 108 to reduce the depth of the cart compartment 102. Such reduction in depth (shown by arrow A in FIG. 3) of the galley 104 as compared to conventional galleys equates to an increase in volume of the passenger area 112. For example, more space may be provided for passenger seats 114. For example, more leg room may be provided for passengers in the passenger seats 114.

A galley refrigeration system is provided for an aircraft that supplies refrigeration air to a compartment of a galley for refrigeration galley carts. The galley refrigeration system includes a liquid heat exchange loop that provides cold liquid supply to one or more air heat exchange loops. The air heat exchange loops provide cold air for a limited number of galley carts, such as a single galley cart. As such, the air heat exchange loops may be sized smaller than conventional heat exchange loops that provide refrigeration for the entire cart compartment and all of the galley carts. The reduced size of the components of the air heat exchange loop, such as thinner ducts, decreases the size of the galley. Additional space is provided in the passenger compartment by shifting the walls of the cart compartment inward (e.g., closer to the galley cart), such as for adding additional room for passenger seating. Additionally, the components, such as the fan, may be smaller than conventional fans, thus reducing the weight of the galley refrigeration system.

It is to be understood that the above description is intended to be illustrative, and not restrictive. For example, the above-described embodiments (and/or aspects thereof)

may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A galley refrigeration system for a galley, the galley refrigeration system comprising:
    a liquid heat exchange loop;
    a first air heat exchange loop in thermal communication with the liquid heat exchange loop, the first air heat exchange loop comprising a first heat exchanger in a cart compartment of the galley and configured to be coupled in flow communication with a first galley cart in the cart compartment; and
    a second air heat exchange loop in thermal communication with the liquid heat exchange loop, the second air heat exchange loop comprising a second heat exchanger in the cart compartment and configured to be coupled in flow communication with a second galley cart in the cart compartment;
    wherein the liquid heat exchange loop is coupled to the galley and the air heat exchange loop is coupled to the galley.

2. The galley refrigeration system of claim 1, wherein the liquid heat exchange loop includes a chiller located on an exterior of the galley and the first heat exchanger of the first air heat exchange loop is interior of the cart compartment, the second air heat exchange loop being interior of the cart compartment.

3. The galley refrigeration system of claim 1, wherein the first and second air heat exchange loops are operated differently to achieve different temperatures in the corresponding at least one galley cart.

4. The galley refrigeration system of claim 1, wherein the liquid heat exchange loop comprises a chiller, a supply line between the chiller and the air heat exchange loop, and a return line between the chiller and the air heat exchange loop.

5. The galley refrigeration system of claim 4, wherein the supply line is in thermal communication with the heat exchanger and at least one other heat exchanger.

6. The galley refrigeration system of claim 1, wherein the second heat exchanger is in flow communication with a plurality of galley carts.

7. The galley refrigeration system of claim 1, wherein the first air heat exchange loop comprises a supply duct between the first heat exchanger and the first galley cart and a return duct between the first heat exchanger and the first galley cart.

8. The galley refrigeration system of claim 1, wherein the second heat exchanger is configured to be coupled in flow communication with a refrigerated compartment.

9. The galley refrigeration system of claim 1, wherein the liquid heat exchange loop comprises a chiller, a supply line in flow communication with the chiller, a return line in flow communication with the chiller, an accumulator in the supply line configured to store cold liquid, and an accumulator bypass configured to bypass the accumulator to transfer liquid to at least one of the first air heat exchange loop for defrosting the first heat exchanger.

10. The galley refrigeration system of claim 1, further comprising a control system in operative communication with the liquid heat exchange loop and the air heat exchange loop.

11. The galley refrigeration system of claim 10, wherein the control system is configured to receive at least one of a liquid supply temperature and a liquid return temperature, the control system controlling operation of the liquid heat exchange loop based on the received temperature.

12. The galley refrigeration system of claim 10, wherein the liquid heat exchange loop comprises a pump, the control system operatively coupled to the pump, the control system controlling the pump based on a temperature of the liquid of the liquid heat exchange loop.

13. The galley refrigeration system of claim 10, wherein the control system controls the first heat exchanger to achieve a predetermined temperature within the first galley cart.

14. The galley refrigeration system of claim 10, wherein the control system controls the first heat exchanger based on a temperature of the liquid heat exchange loop.

15. The galley refrigeration system of claim 10, wherein the heat exchanger includes a variable speed fan, the control system controlling a speed of the fan to achieve a predetermined temperature in the first galley cart.

16. The galley refrigeration system of claim 10, further comprising at least one temperature sensor configured to sense a temperature of at least one of the liquid heat exchange loop and the first air heat exchange loop, the at least one temperature sensor being in operative communication with the control system.

17. The galley refrigeration system of claim 10, wherein the control system is configured to receive at least one of an air supply temperature and an air return temperature, the control system controlling operation of the air heat exchange loop based on the received temperature.

18. The galley refrigeration system of claim 17, wherein the control system is configured to diagnose at least one of operation of the first heat exchanger and efficiency of the galley cart based on the received temperature.

19. A galley system comprising:
    a galley having a rear wall and a counter, the galley having a cart compartment below the counter for receiving galley carts;
    a liquid heat exchange loop coupled to the galley, the liquid heat exchange loop having a chiller outside of the cart compartment, the chiller being coupled to the galley, the liquid heat exchange loop having a supply line and a return line along the rear wall extending from the chiller into the cart compartment; and an air heat exchange loop coupled to the galley inside of the cart compartment, the air heat exchange loop comprising a heat exchanger configured to be coupled in flow communication with the liquid heat exchange loop, the air heat exchange loop having a supply duct and a return duct contained below the counter in the cart compartment of the galley.

20. The galley system of claim 19, wherein the liquid heat exchange loop extends through the rear wall to the cart compartment.

21. The galley system of claim 19, wherein the supply duct and return duct extend along the rear wall in the cart compartment for flow communication with the galley cart, the rear wall above the counter being devoid of the supply duct and the return duct.

22. The galley system of claim 19, wherein the supply and return lines and the supply and return ducts being provided in the rear wall.

23. The galley system of claim 19, further comprising a galley cart received in the cart compartment, the galley cart being an insulated galley cart having supply and return ports in flow communication with the air heat exchange loop, the air heat exchange loop configured to supply air in an air-through-cart supply arrangement.

24. The galley system of claim 19, wherein the cart compartment comprises a plurality of cart bays, each cart bay receiving a corresponding galley cart, the galley system comprising a plurality of the air heat exchange loops, each air heat exchange loop associated with a corresponding cart bay and galley cart.

25. The galley system of claim 19, wherein the supply duct and the return duct are in flow communication with a plurality of galley carts.

26. The galley system of claim 19, wherein the heat exchanger is positioned in the cart compartment.

27. The galley system of claim 26, wherein the heat exchanger is positioned above the counter, the supply and return ducts extending from the heat exchanger into the cart compartment.

* * * * *